United States Patent
Murata et al.

(10) Patent No.: US 9,951,709 B2
(45) Date of Patent: Apr. 24, 2018

(54) DRIVE CONTROL DEVICE AND DRIVE CONTROL METHOD FOR HYBRID ELECTRIC VEHICLE

(71) Applicant: NISSAN MOTOR CO., LTD., Yokohama-shi, Kanagawa (JP)

(72) Inventors: Hiromichi Murata, Atsugi (JP); Hiroki Matsui, Ebina (JP); Jun Amemiya, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 180 days.

(21) Appl. No.: 14/385,228

(22) PCT Filed: Mar. 15, 2013

(86) PCT No.: PCT/JP2013/057387
§ 371 (c)(1),
(2) Date: Sep. 15, 2014

(87) PCT Pub. No.: WO2013/137430
PCT Pub. Date: Sep. 19, 2013

(65) Prior Publication Data
US 2015/0051817 A1    Feb. 19, 2015

(30) Foreign Application Priority Data
Mar. 16, 2012    (JP) .................... 2012-060379

(51) Int. Cl.
*F02D 41/30* (2006.01)
*B60K 6/48* (2007.10)
(Continued)

(52) U.S. Cl.
CPC .......... *F02D 41/3011* (2013.01); *B60K 6/48* (2013.01); *B60W 10/02* (2013.01); *B60W 10/06* (2013.01);
(Continued)

(58) Field of Classification Search
CPC ..... F01L 2001/3445; F01L 2001/34453; F01L 2001/34456; F01L 2001/34459;
(Continued)

(56) References Cited

U.S. PATENT DOCUMENTS 5,924,395 A * 7/1999 Moriya .................... B60K 6/46
123/179.18
7,167,792 B1 * 1/2007 Kolmanovsky ........ F02M 27/02
123/345

(Continued)

FOREIGN PATENT DOCUMENTS

JP    8-121203 A    5/1996
JP    2009-208700 A    9/2009
(Continued)

*Primary Examiner* — David Hamaoui
*Assistant Examiner* — Carl Staubach
(74) *Attorney, Agent, or Firm* — Foley & Lardner LLP (57) ABSTRACT

A hybrid electric vehicle comprises an internal combustion engine and an electric motor/generator connected via a first clutch. In response to a system stop request in a vehicle stop state, a rotation speed of the internal combustion engine is decreased to a predetermined rotation speed higher than a predetermined resonance frequency band by a negative torque applied to the internal combustion engine from the electric motor/generator via the first clutch. Then, the disengagement of the first clutch starts. The rotation speed of the engine falls below the predetermined resonance frequency band within a predetermined period from the start of the disengagement. As a consequence, the required period from a stopping operation of the internal combustion engine until actual operation stop thereof in a vehicle stationary state is reduced.

11 Claims, 6 Drawing Sheets

(51) Int. Cl.
*B60W 10/02* (2006.01)
*B60W 10/06* (2006.01)
*B60W 10/08* (2006.01)
*B60W 20/40* (2016.01)
*F02D 25/00* (2006.01)
*F02D 41/04* (2006.01)
*F02D 13/02* (2006.01)
*F01L 1/344* (2006.01)
*F02D 29/02* (2006.01)
*F02D 41/12* (2006.01)
*F02N 11/04* (2006.01)

(52) U.S. Cl.
CPC ............ *B60W 10/08* (2013.01); *B60W 20/40* (2013.01); *F01L 1/3442* (2013.01); *F02D 13/0219* (2013.01); *F02D 25/00* (2013.01); *F02D 41/042* (2013.01); *B60K 2006/4825* (2013.01); *B60W 2710/0644* (2013.01); *B60W 2710/081* (2013.01); *F01L 2001/3443* (2013.01); *F01L 2001/34469* (2013.01); *F02D 29/02* (2013.01); *F02D 41/12* (2013.01); *F02D 2250/24* (2013.01); *F02N 11/04* (2013.01); *Y02T 10/18* (2013.01); *Y02T 10/6221* (2013.01); *Y02T 10/6252* (2013.01); *Y02T 10/6286* (2013.01)

(58) Field of Classification Search
CPC ... F01L 2001/34463; F01L 2001/34473; F01L 1/3442; F01L 2001/3443; F01L 2001/34469; B60K 2006/4825; B60K 6/48; B60W 10/02; B60W 10/06; B60W 10/08; B60W 20/40; B60W 2710/0644; B60W 2710/081; F02D 13/0219; F02D 2250/24; F02D 2250/28
USPC ............ 701/22, 54, 51, 103, 112, 102, 104; 180/65.265, 65.275, 65.28, 65.285, 65.25, 180/65.21, 65.23, 65.225; 903/930, 946, 903/902, 906, 914; 123/90.15–90.18, 123/179.4, 320–322, 345–348; 477/107, 477/5
See application file for complete search history.

(56) References Cited

U.S. PATENT DOCUMENTS

| | | | | |
|---|---|---|---|---|
| 7,571,709 | B2* | 8/2009 | Lewis | F01L 9/04 123/320 |
| 8,682,544 | B2* | 3/2014 | Hashimoto | B60W 10/02 180/65.21 |
| 2002/0139333 | A1* | 10/2002 | Kusano | F01L 1/34 123/90.17 |
| 2003/0004635 | A1* | 1/2003 | Kamiya | B60W 10/06 701/112 |
| 2003/0019447 | A1* | 1/2003 | Todd | F01L 1/3442 123/90.15 |
| 2004/0045750 | A1* | 3/2004 | Baraszu | B60K 6/48 180/65.25 |
| 2005/0124460 | A1* | 6/2005 | Iriyama | F02D 41/022 477/107 |
| 2005/0188939 | A1* | 9/2005 | Iwatsuki | B60K 6/445 123/179.4 |
| 2006/0027413 | A1* | 2/2006 | Tabata | B60K 6/365 180/305 |
| 2007/0205036 | A1* | 9/2007 | Ogata | B60K 6/48 180/337 |
| 2009/0159027 | A1* | 6/2009 | Nakamura | F01L 1/022 123/90.17 |
| 2010/0131180 | A1* | 5/2010 | Hattori | B60K 6/365 701/105 |
| 2010/0174460 | A1* | 7/2010 | Gibson | B60W 10/026 701/54 |
| 2010/0235067 | A1* | 9/2010 | Nomura | F01L 1/344 701/103 |
| 2010/0286858 | A1 | 11/2010 | Otokawa | |
| 2012/0037105 | A1* | 2/2012 | Nakamura | F01L 1/053 123/90.16 |
| 2012/0067309 | A1* | 3/2012 | Murai | F02D 13/0226 123/90.1 |
| 2012/0215392 | A1* | 8/2012 | Hashimoto | B60W 10/02 701/22 |
| 2012/0247424 | A1* | 10/2012 | Hayashi | F02D 41/086 123/339.21 |
| 2012/0291750 | A1* | 11/2012 | Yokoyama | F01L 1/3442 123/347 |
| 2015/0032358 | A1* | 1/2015 | Amemiya | B60K 6/48 701/104 |

FOREIGN PATENT DOCUMENTS

| | | | |
|---|---|---|---|
| JP | 2010-195361 A | 9/2010 | |
| JP | 2010-274876 A | 12/2010 | |
| WO | WO 2011/070673 A1 * | 6/2011 | ............ B60L 11/00 |
| WO | WO 2011/099124 A1 * | 8/2011 | ............ F01L 1/3442 |

* cited by examiner

DRIVE CONTROL DEVICE AND DRIVE CONTROL METHOD FOR HYBRID ELECTRIC VEHICLE

TECHNICAL FIELD

This invention relates to control when an operation of a hybrid electric vehicle traveling by using a power of an internal combustion engine while an electric motor is stationary.

BACKGROUND ART

On a hybrid electric vehicle on which an internal combustion engine and an electric motor are installed, an electric vehicle (EV) mode travel using only the electric motor as power for travel and a hybrid electric vehicle (HEV) mode (HEV) travel using both the internal combustion engine and the electric motor as the power for travel are selectively applied. For that purpose, the internal combustion engine and the electric motor are connected by a clutch.

When a driver of the hybrid electric vehicle turns off an ignition key of the vehicle during the engine operation in a vehicle stop state, the fuel supply to the internal combustion engine stops under a state in which the clutch is engaged. In such a case, the hybrid electric vehicle according to JP 08-121203 A, published in 1996 by the Japan Patent Office, proposes to first disengage the clutch, and then stop the fuel supply to the internal combustion engine.

SUMMARY OF INVENTION

If the fuel supply to the internal combustion engine stops under a state in which the clutch is disengaged, the internal combustion engine decreases the rotation speed depending on an internal friction resistance. As a result, it takes time until the rotation of the internal combustion engine stops, which may cause a driver and passengers to feel a sense of discomfort.

It is therefore an object of this invention to reduce a required period from the operation of stopping the rotation of the internal combustion engine to the actual rotation stop thereof.

In order to achieve the above object, this invention provides a drive control device for a hybrid electric vehicle. The vehicle comprises an internal combustion engine provided with variable valve timing mechanism, an electric motor, and a clutch connecting the internal combustion engine and the electric motor.

The drive control device comprises a sensor that detects a request for stopping operation of the internal combustion engine and a programmable controller programmed as follows.

Specifically, the controller is programmed to decrease, when the request for stopping operation of the internal combustion engine is detected during an operation of the internal combustion engine, a rotation speed of the internal combustion engine to a predetermined rotation speed higher than a predetermined resonance vibration frequency band by stopping a fuel supply to the internal combustion engine and exerting a negative torque to the internal combustion engine from the electric motor via the clutch in an engaged state, disengage the clutch after the rotation speed of the internal combustion engine has decreased to the predetermined rotation speed, and control the variable valve timing mechanism to return to a predetermined position prior to decrease the rotation speed of the internal combustion engine to the predetermined rotation speed.

The details as well as other features and advantages of this invention are set forth in the remainder of the specification and are shown in the accompanying drawings.

DESCRIPTION OF EMBODIMENTS

Figure 1:
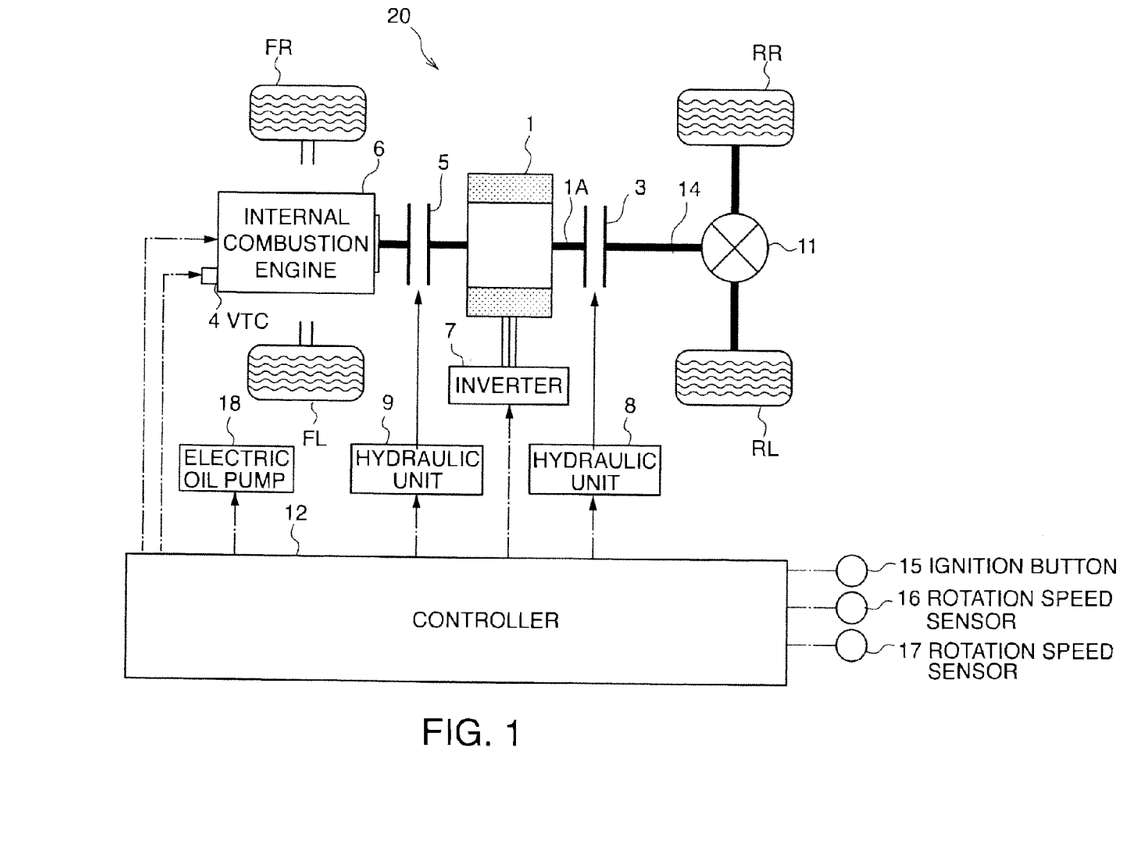
FIG. 1 is a schematic diagram of a hybrid electric vehicle to which this invention is applied.

Referring to FIG. 1 of the drawings, a drive control device according to an embodiment of this invention is applied to a hybrid electric vehicle 20 of a rear drive type. The hybrid electric vehicle 20 travels by using four wheels including a front right wheel FR, a front left wheel FL, a rear right wheel RR, and a rear left wheel RL. Of those wheels, the rear right wheel RR and the rear left wheel RL serve as driving wheels.

The rear right wheel RR and the rear left wheel RL, which serve as the driving wheels, are coupled to a propeller shaft 14 via a differential 11. The propeller shaft 14 is connected to an electric motor/generator 1 via a second clutch 3. An internal combustion engine 6 is connected to the electric motor/generator 1 via a first clutch 5.

The first clutch 5 is a normally engaged clutch, which is disengaged by a hydraulic pressure supplied from a hydraulic unit 9, and is engaged when the hydraulic pressure is released. A torque is transmitted bi-directionally between the electric motor/generator 1 and the internal combustion engine 6 at an engaged position so that the electric motor/generator 1 and the internal combustion engine 6 are rotated integrally. The electric motor/generator 1 and the internal combustion engine 6 are freely rotated relative to each other at a disengaged position.

The internal combustion engine 6 comprises a variable valve timing control mechanism (VTC) 4 for changing the valve timing in accordance with an operation state.

Figure 4A:
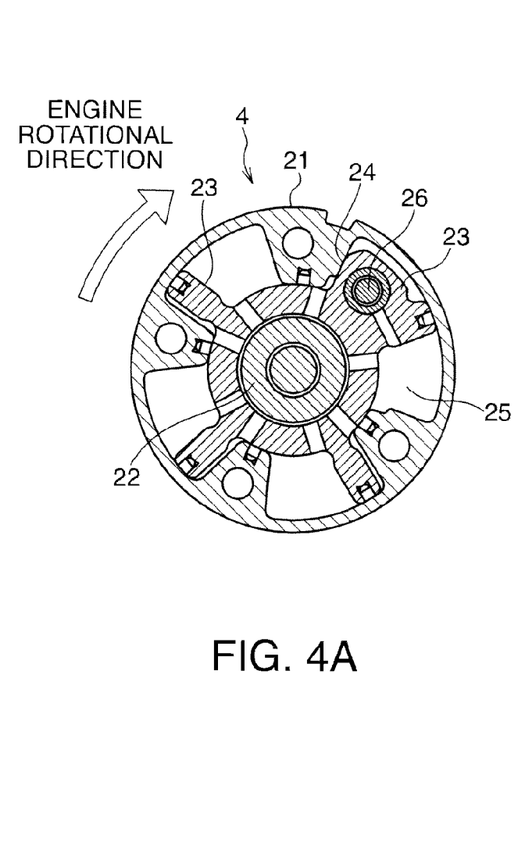
FIGS. 4A and 4B are respectively a horizontal cross sectional view of a variable valve timing mechanism of an internal combustion engine, and a vertical cross sectional view of a lock pin of the variable valve timing mechanism.

Referring to FIG. 4A, the VTC 4 comprises a cylindrical body 21, a rotational shaft 22 supported in a freely rotatable manner at the center of the body 21, and four vanes 23 protruding in radial directions at equal angular intervals from an outer periphery of the rotational shaft 22. An advance chamber 24 and a retard chamber 25 are defined on both sides in a peripheral direction of each of the vanes 23.

Each of the vanes 23 rotationally displaces the rotational shaft 22 in accordance with a hydraulic pressure supplied to the advance chamber 24 and the retard chamber 25. The valve timing of the internal combustion engine 6 changes to an advance side or a retard side in accordance with a rotational position of the rotational shaft 22.

Figure 4B:
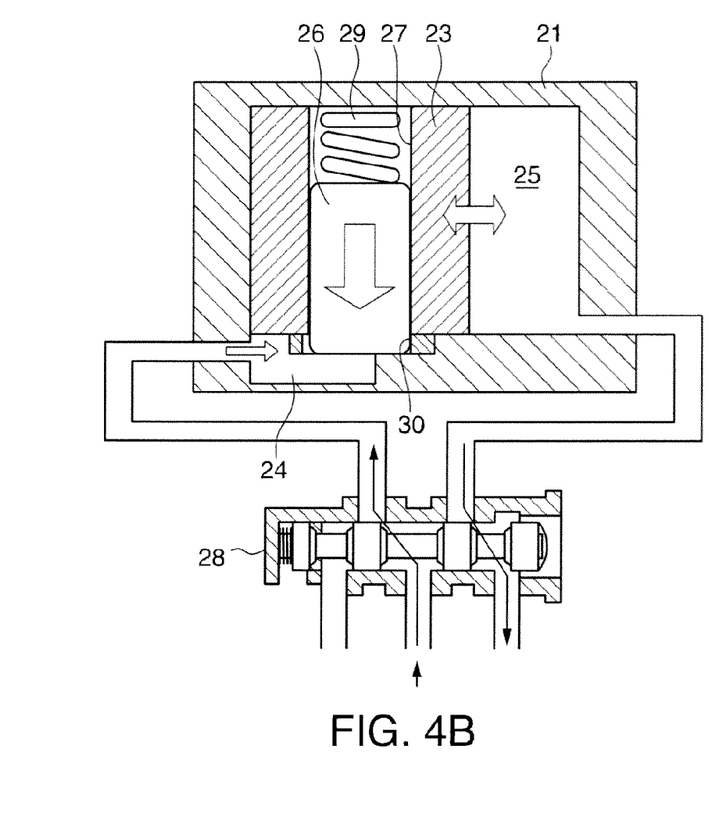

Referring to FIG. 4B, a working fluid is selectively supplied to the advance chamber 24 and the retard chamber 25 through a VTC valve 28 of a spool type, which magnetically operates in response to a signal. As illustrated in FIG. 4B, when the working fluid is supplied to the advance chamber 24, the working fluid in the retard chamber 25 is discharged, and the rotational shaft 22 changes the valve timing.

A lock pin 26 for fixing a rotational displacement of the vanes 23 and the rotational shaft 22 to a position corresponding to an intake/exhaust timing for a steady state operation of the internal combustion engine 6 is provided on one of the four vanes 23.

The lock pin 26 is fitted in a freely slidable manner inside a through hole 27 passing through the vane 23 in parallel to the rotational shaft 22, and is urged by a coil spring 29 in parallel to the rotational shaft 22. An engagement hole 30 for receiving a distal end of the lock pin 26 is formed in the body 21. As illustrated in FIG. 4A, a position at which the engagement hole 30 is formed corresponds to a position at which the rotational shaft 22 is rotationally displaced maximally to the retard side.

When the rotational shaft 22 is rotationally displaced maximally to the retard side, the lock pin 26 urged by the coil spring 29 automatically enters into the engagement hole 30, thereby locking the rotation of the vanes 23 and the rotational shaft 22 at the maximal retard position. On the other hand, when the working fluid is supplied from the VTC valve 28 to the advance chamber 24, the lock pin 26 is displaced by a hydraulic pressure toward a retraction direction from the engagement hole 30 against the coil spring 29, resulting in a release of the lock. The vanes 23 together with the rotational shaft 22 are rotationally displaced toward the advance side by the pressure of the working fluid supplied to the advance chamber 24.

The internal combustion engine 6 comprises the VTC 4 constructed as described above on one or both of the intake valve and the exhaust valve, thereby changing the valve timing in accordance with operation conditions.

When the fuel supply to the internal combustion engine 6 is cut under a state in which the lock pin 26 is not locked in the VTC 4, the rotation speed of the internal combustion engine 6 passes through a resonance frequency band in a course of decrease in the rotation speed of the internal combustion engine 6. At this time, the vanes 23 oscillate in a direction indicated by a horizontal arrow in FIG. 4B inside the body 21, resulting in generation of an oscillation sound.

The second clutch 3 is activated by a hydraulic pressure supplied from a hydraulic unit 8, and, in an engaged state, the second clutch 3 engages an output shaft 1A of the electric motor/generator 1 and the propeller shaft 14 with each other for an integral rotation. In a disengaged state, the second clutch 3 causes a relative rotation between an input shaft 4A and the propeller shaft 14 without resistance.

Both the first clutch 5 and the second clutch 3 are respectively constructed by friction clutches.

The supply of a hydraulic pressure to hydraulic apparatus including the hydraulic units 8 and 9 is carried out by an electric oil pump 18 additionally installed on the internal combustion engine 6.

An inverter 7 is connected to the electric motor/generator 1. The electric motor/generator 1 is rotated by electric power supplied from a battery (not shown) via the inverter 7. Moreover, the electric motor/generator 1 generates electric power by a torque of the internal combustion engine 6, which is input via the first clutch 5 in the engaged state, to thereby charge the battery.

The operation and the power generation of the electric motor/generator 1 are controlled in response to a signal input from a controller 12 to the inverter 7. An operation of the electric oil pump 18 is carried out in response to an operation signal from the controller 12. The engagement and the disengagement of the second clutch 3 are carried out in response to a signal input from the controller 12 to the hydraulic unit 8. The engagement and the disengagement of the first clutch 5 are carried out in response to a signal input from the controller 12 to the hydraulic unit 9. The operation of the internal combustion engine 6 including the operation of the VTC 4 is also controlled in response to a signal input from the controller 12.

The controller 12 configured to carry out the above-mentioned control is constructed by a microcomputer comprising a central processing unit (CPU), a read-only memory (ROM), a random access memory (RAM), and an input/output interface (I/O interface). According to this embodiment, for the sake of description, it is assumed that the single controller 12 entirely controls the hydraulic units 8 and 9, the operation of the internal combustion engine 6, the operation of the electric oil pump 18, and the operation of the electric motor/generator 1, but different controllers may carry out the control depending on the object to be controlled.

Detection signals are respectively input to the controller 12 via a signal circuit from an ignition button 15 for inputting a request for stopping operation of the internal combustion engine 6 by a driver when the hybrid electric vehicle 20 is stationary, a rotation speed sensor 16 for detecting the rotation speed of the internal combustion engine 6, and an rotation speed sensor 17 for detecting a rotation speed of the electric motor/generator 1.

In the configuration described above, the hybrid electric vehicle 20 carries out an EV mode travel, in which the power of only the electric motor/generator 1 is used, and an HEV mode travel, in which the power of the electric motor/generator 1 and the power of the internal combustion engine 6 are used in combination.

It should be noted, when the fuel supply to the internal combustion engine in operation is stopped under a state in which the hybrid electric vehicle 20 is stationary and the first clutch 5 is disengaged, the internal combustion engine decreases the rotation speed according to an internal friction resistance. As a result, it takes time until the rotation of the internal combustion engine 6 stops, which may cause a driver and passengers to feel a sense of discomfort.

Figure 2:
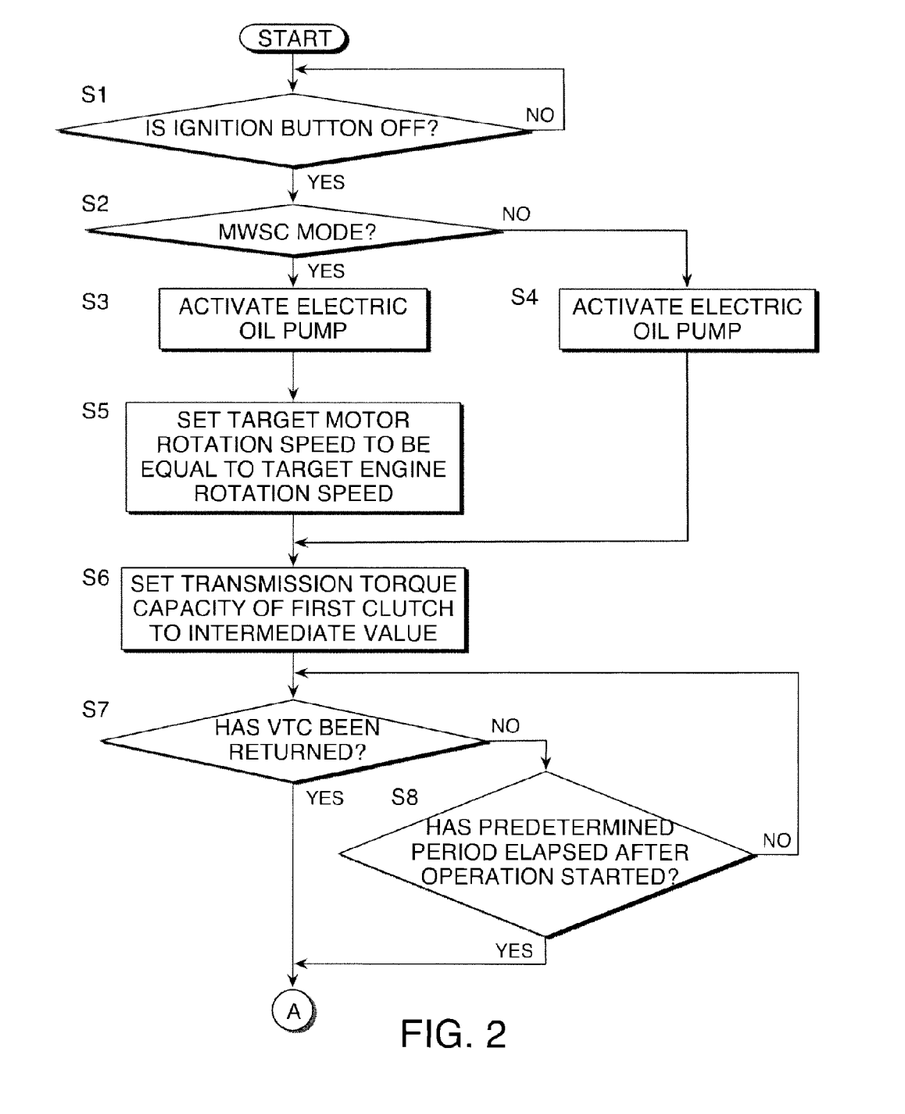
FIG. 2 is a flowchart illustrating a part of an internal combustion engine operation stop routine executed by a controller according to this invention.
Figure 3:
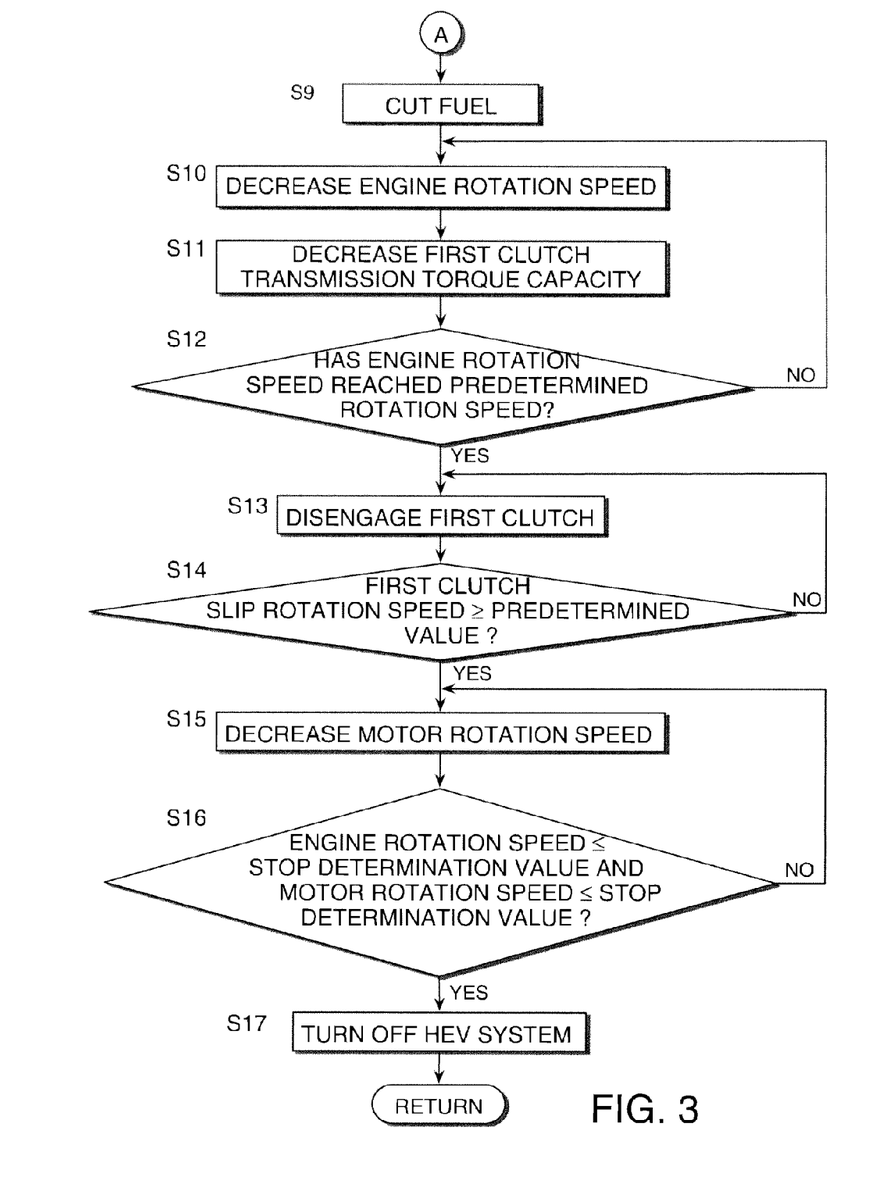
FIG. 3 is a flowchart illustrating the rest of the internal combustion engine operation stop routine executed by the controller.

The controller 12 executes an internal combustion engine operation stop routine illustrated in FIGS. 2 and 3, thereby quickly stopping the operation of the internal combustion engine 6. Execution conditions of the routine are such a condition that the internal combustion engine 6 is in operation and such a condition that the hybrid electric vehicle 20 is stopping.

Referring to FIG. 2 first, in a step S1, the controller 12 determines whether the ignition button 15 is turned off or not. When the ignition button 15 is not turned off, the controller 12 waits until the ignition button 15 is turned off.

When the ignition button 15 is turned off, in a step S2, the controller 12 determines whether the hybrid electric vehicle 20 is in an MWSC mode or not. The MWSC mode is a mode in which the controller 12 controls the first clutch 5 to be disengaged and also controls the hybrid electric vehicle 20 to travel by the torque output from the electric motor/generator 1. The MWSC mode is represented as a flag as a result of selection of the travel mode carried out in another routine by the controller 12. The controller 12 determines whether the current travel mode is the MWSC mode or not based on the flag.

The torque output from the internal combustion engine 6 is used in travel modes other than the MWSC mode, and the first clutch 5 is thus engaged. In the step S2, as a convenient method of determining whether the first clutch 5 is in the engaged state or not, the controller 12 determines whether the current travel mode is the MWSC mode or not.

When the hybrid electric vehicle 20 is in the MWSC mode, in other words, the first clutch 5 is disengaged, the controller 12 activates the electric oil pump 18 in a step S3. The hydraulic pressure required by an entire drive system including the hydraulic units 8 and 9 and the VTC 4 in the hybrid electric vehicle 20 is supplied from the mechanical oil pump additionally installed on the internal combustion engine 6 when the internal combustion engine 6 is in operation. Moreover, the required hydraulic pressure is supplied by operating the additionally installed electric oil pump 18 in the EV mode travel, in which the internal combustion engine 6 is stopped. The electric oil pump 18 is activated in the step S3.

Then, in a step S5, the controller 12 sets a target motor rotation speed of the electric motor/generator 1 to a rotation speed equal to a target engine rotation speed. This is preparation for first rotating the electric motor/generator 1 and the internal combustion engine 6 in synchronous with each other in order to control the engine rotation speed via the control of the rotation speed of the electric motor/generator 1. After the processing in the step S5, the controller 12 performs processing in a step S6.

On the other hand, when the hybrid electric vehicle 20 is not in the MWSC mode, in other words, the first clutch 5 is engaged in the step S2, the internal combustion engine 6 and the electric motor/generator 1 are already rotating synchronously. In this case, the controller 12 activates the electric oil pump 18 in a step S4, and then performs the processing in the step S6.

In the step S6, the controller 12 controls the hydraulic pressure of the hydraulic unit 9 so that the transmission torque capacity of the first clutch 5 is an intermediate value. On this occasion, the intermediate value is a value serving as a start point for processing of decreasing the transmission torque capacity of the first clutch 5, and is a value of permitting both the transmission of the torque and a slip between the electric motor/generator 1 and the internal combustion engine 6. In other words, the electric motor/generator 1 and the internal combustion engine 6 are rotated synchronously with each other, thereby transmitting the torque until the transmission torque reaches the intermediate value. When the transmission torque exceeds the intermediate value, the slip rotation occurs, thereby permitting a relative rotation between the electric motor/generator 1 and the internal combustion engine 6.

When the determination in the step S2 is affirmative, in other words, when the first clutch 5 is disengaged, in the step S6, the transmission torque of the first clutch 5 is increased by setting the transmission torque capacity to the intermediate value. On the other hand, when the determination in the step S2 is negative, in other words, when the first clutch 5 is engaged, in the step S6, the transmission torque of the first clutch 5 is decreased by setting the transmission torque capacity to the intermediate value.

It should be noted that when the ignition button 15 is turned off in the step S1, the controller 12 controls the VTC 4 of the internal combustion engine 6 to return to the maximal retard position illustrated in FIG. 4A, and also controls the lock pin 26 to engage with the engagement hole 30. This operation is referred to as a return operation for the VTC 4. The return operation for the VTC 4 is executed by another routine.

In a step S7, the controller 12 determines whether the return operation for the VTC 4 executed by the another routine has been completed or not. Specifically, the controller 12 determines whether the lock pin 26 has engaged with the engagement hole 30 and the vanes 23 are fixed to the maximal retard position or not. When the determination in the step S7 is affirmative, even if the decreasing engine rotation speed passes through the resonance frequency band, the vanes 23 of the VTC 4 do not oscillate, and the oscillation sound is not generated. In this case, the controller 12 performs processing starting from a step S9 in FIG. 3.

On the other hand, when the return operation for the VTC 4 has not been completed, in a step S8, the controller 12 determines whether a predetermined period has elapsed or not after the return operation for the VTC 4 is started. When the predetermined period has elapsed, the controller 12 performs the processing starting from the step S9 in FIG. 3. When the predetermined period has not elapsed, the controller 12 repeats the determinations in the steps S7 and S8, thereby waiting for the completion of the return operation for the VTC 4, or the elapse of the predetermined period after the operation is started.

The determination in the step S8 has the following meaning. For example, the VTC 4 cannot sometimes be returned in the predetermined period due to failure in the VTC 4 or low temperature of the working fluid. The time limit is imposed on the return operation for the VTC 4 in the step S8, and hence the operation stop processing for the internal combustion engine 6 is continued without waiting for the completion of the return operation for the VTC 4 when the time limit is reached. As a result, the operation stop processing for the internal combustion engine 6 can be prevented from delaying.

Referring to FIG. 3, in the step S9, the controller 12 cuts the fuel supply to the internal combustion engine 6 in operation.

In a step S10, the controller 12 decreases the rotation speed of the electric motor/generator 1 via the inverter 7, thereby decreasing the rotation speed of the internal combustion engine 6 by a certain amount.

In a step S11, the controller 12 controls the hydraulic unit 9, thereby decreasing the transmission torque capacity of the first clutch 5 from the intermediate value by a certain amount.

In a step S12, the controller 12 determines whether the engine rotation speed has decreased to a predetermined rotation speed or not. The predetermined rotation speed is set to a value higher than the resonance frequency band of a drive system ranging from the internal combustion engine 6 to the driving wheels RR and RL. When the determination is negative, the controller 12 repeats the processing in the steps S10 and S11 and the determination in the step S12. When the determination changes to be affirmative, in other words, when the engine rotation speed decreases to the predetermined rotation speed, the controller 12 performs the processing in a step S13.

In the step S13, the controller 12 stops the supply of the hydraulic pressure from the hydraulic unit 9 to the first clutch 5, and disengages the first clutch 5.

In a step S14, the controller 12 determines whether a slip rotation speed of the first clutch 5 is equal to or higher than a predetermined value or not based on the signals input from the rotation speed sensors 16 and 17. On this occasion, the slip rotation speed is a difference in rotation speed between the internal combustion engine 6 and the electric motor/generator 1. When the determination is affirmative, the controller 12 performs processing in a step S15. When the determination is negative, the controller 12 repeats the processing in the step S13 and the determination in the step S14. This process has the following meaning. Even when the supply of the hydraulic pressure to the first clutch 5 is stopped, the first clutch 5 is not immediately disengaged. A substantial disengagement of the first clutch 5 can be confirmed by repeating the processing in the step S13 and the determination in S14.

In the step S15, the controller 12 further decreases the rotation speed of the electric motor/generator 1.

In a step S16, the controller 12 determines whether the rotation speed of the internal combustion engine 6 and the rotation speed of the electric motor/generator 1 have decreased to rotation speeds equal to or lower than the respective predetermined values. When the determination is negative, the controller 12 repeats the processing in the step S15 and the determination in the step S16. The first clutch 5 is disengaged, and the rotation speed of the internal combustion engine 6 at this stage is thus decreased by the friction resistance.

When the determination in the step S16 changes to be affirmative, in a step S17, the controller 12 turns off the HEV system, and finishes the routine.

Referring to FIGS. 5A to 5D and FIGS. 6A to 6D, a description is now given of execution results of the internal combustion engine operation stop routine.

FIGS. 5A to 5D show the routine execution result in the NWSC mode, in other words, in the state in which the first clutch 5 is disengaged. FIGS. 6A to 6D show the routine execution result in a mode other than the MWSC mode, in other words, in the state in which the first clutch 5 is engaged.

Referring to FIGS. 5A to 5D, it is assumed here that the driver turns off the ignition button 15 at a time t1 under the state in which the hybrid electric vehicle 20 is stationary, the first clutch 5 is disengaged, the internal combustion engine 6 is in operation, and the electric motor/generator 1 is stopped. This state occurs when the hybrid electric vehicle 20 travels by using the power of the internal combustion engine 6, and then stops.

When the ignition button 15 is turned off, the determination in the step S1 changes from to the affirmative in the internal combustion engine operation stop routine executed by the controller 12. The determination in the step S2 is affirmative in the MWSC mode.

Figure 5A:
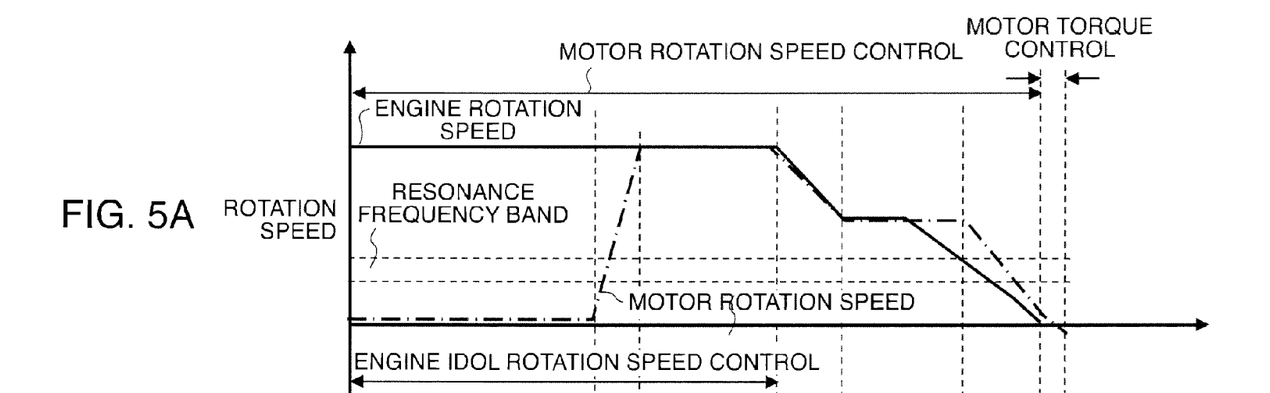
FIGS. 5A to 5D are timing charts showing an execution result of the internal combustion engine operation stop routine.
Figures 5B, 5C:
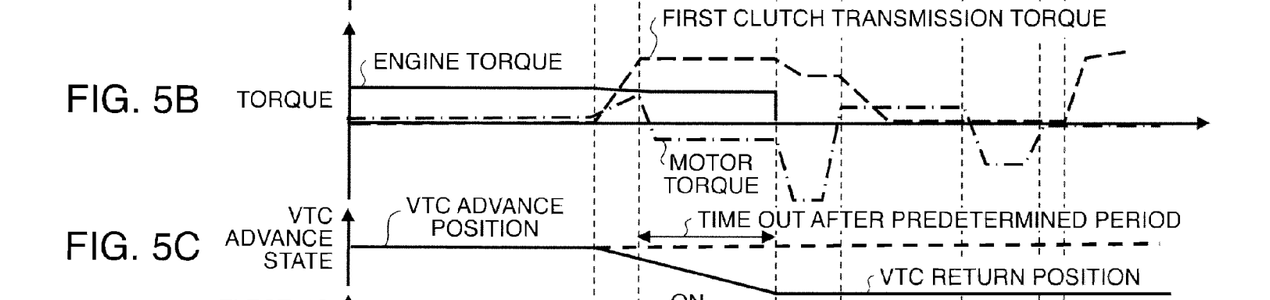
Figure 5D:
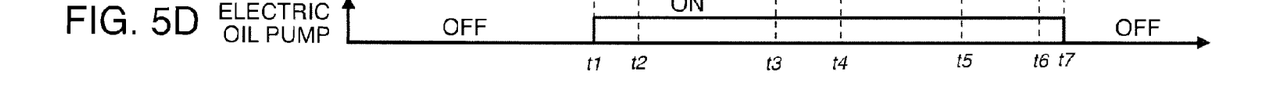

As a result of the affirmative determination in the step S2, the controller 12 activates the electric oil pump 18 in the step S3 as shown in FIG. 5D. The start of the activation of the electric oil pump 18 has the following meaning. In the course of the stop processing for the internal combustion engine 6, the supply source of the hydraulic pressure to the hydraulic apparatus such as the hydraulic units 8 and 9 switches from the mechanical oil pump additionally installed on the internal combustion engine 6 to the electric oil pump 18. If the switching is carried out depending on the rotation speed of the internal combustion engine 6, a delay may occur in the switching under the state in which the rotation speed of the internal combustion engine 6 greatly changes, which is observed after a time t3. As a result, the hydraulic pressure used for the disengagement operation for the first clutch 5 carried out in the step S11 may not be supplied. The defect can be prevented by activating the electric oil pump 18 in advance in the step S3.

In the step S4, the controller 12 sets the target rotation speed of the electric motor/generator 1 to the value equal to the target rotation speed of the internal combustion engine 6, and, in the step S5, sets the transmission torque capacity of the first clutch 5 to the intermediate value. As a result, as shown in FIG. 5A, the rotation speed of the electric motor/generator 1 increases at a time t2. Under this state, as shown in FIG. 5B, the motor torque of the electric motor/generator 1 takes a negative value. In other words, a state in which the rotational torque of the internal combustion engine 6 transmitted from the first clutch 5 forces the rotation speed of the electric motor/generator 1 to increase occurs.

On the other hand, in the step S7, the controller 12 determines whether the return operation of the VTC 4 has been completed or not at this stage. Moreover, when the return operation has not been completed, in the step S8, the controller 12 determines whether the elapsed period after the start of the return operation has reached the predetermined period or not.

It should be noted that, when the determination in the step S7 or S8 changes to be affirmative at the time t3, in the step S9, the controller 12 cuts the fuel supply to the internal combustion engine 6. Moreover, in the step S10, the controller 12 decreases the rotation speed of the internal combustion engine 6 via the rotation speed control for the electric motor/generator 1. As a result of this processing, the rotation speed of the internal combustion engine 6 is quickly decreased. Moreover, as the rotation speed of the internal combustion engine 6 decreases, in the step S11, the transmission torque capacity of the first clutch 5 is also decreased.

When the rotation speed of the internal combustion engine 6 decreases to the predetermined rotation speed at a time t4, the determination in the step S12 changes to be affirmative. As a result, the controller 12 finishes the forced decrease in the rotation speed of the internal combustion engine 6 by the operation control for the electric motor/generator 1. Subsequently, the rotation speed of the internal combustion engine 6 is decreased depending only on the friction resistance. On the other hand, the electric motor/generator 1 is maintained to the rotation speed at the time t4.

As a result, at a time t5 of FIG. 5A, when the slip rotation speed of the first clutch 5, in other words, the rotation speed difference between the internal combustion engine 6 and the electric motor/generator 1 reaches a value equal to or greater than the predetermined value, in the step S15, the controller 12 decreases the rotation speed of the electric motor/generator 1 by the control for the inverter 8.

Subsequently, at a time t7 when both the engine rotation speed and the motor rotation speed becomes a rotation speed equal to or lower than a stop determination value, the controller 12 turns off the HEV system. In other words, the controller 12 turns off all the apparatus for operating the internal combustion engine 6.

Referring to FIGS. 6A to 6D, it is assumed here that the driver turns off the ignition button 15 at a time t1 in a state in which the hybrid electric vehicle 20 is stationary, the first clutch 5 is engaged, the internal combustion engine 6 is in operation, and the electric motor/generator 1 is rotating. This state corresponds to a state in which the internal combustion engine 6 drives the electric motor/generator 1 to carry out the power generation due to a decrease in a buttery charged amount in the vehicle stop state.

Figure 6A:
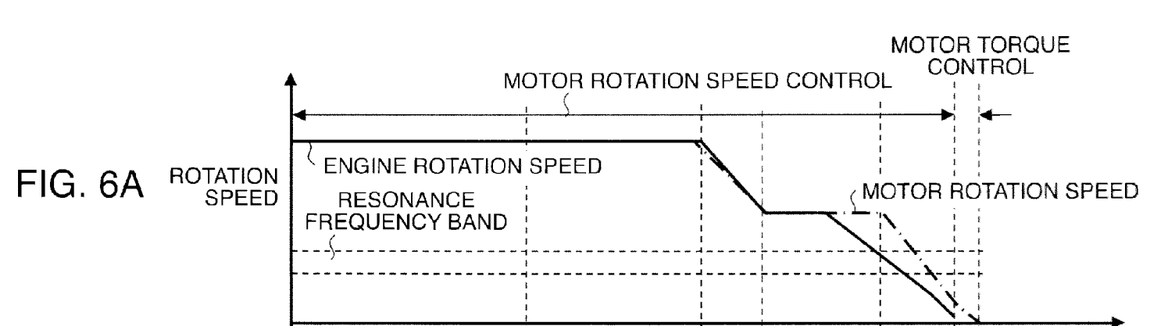
FIGS. 6A to 6D are timing charts showing another execution result of the internal combustion engine operation stop routine.
Figure 6B:
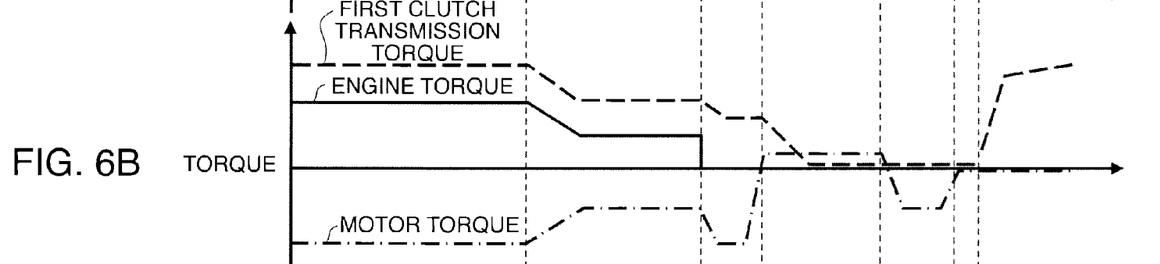
Figure 6C:
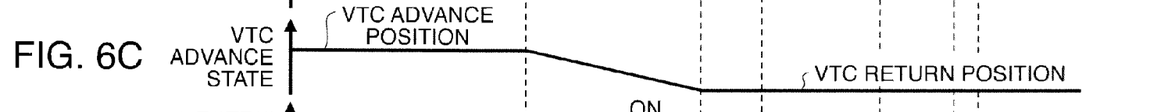
Figure 6D:
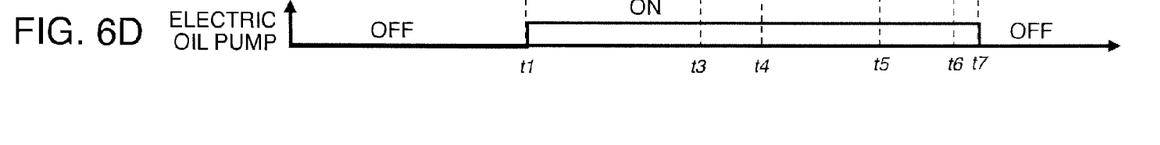

In this case, as shown in FIG. 6A, the first clutch 5 is engaged, and the internal combustion engine 6 and the electric motor/generator 1 are synchronously rotating. Thus, the determination in the step S2 is negative, and as a result of the execution of the processing of the step S4, as shown in FIG. 6D, the electric oil pump 18 is activated at the time t1.

Then, the rotation speed of the internal combustion engine 6 and the rotation speed of the electric motor/generator 1 are maintained until the completion of the return operation for the VTC 4 or the timeout. At a time t3, in the step S10, the controller 12 decreases the rotation speed of the internal combustion engine 6 via the rotation speed control for the electric motor/generator 1. The subsequent processing is the same as that in the case of the MWSC mode.

As a result of the execution of the internal combustion engine operation stop routine, the following effects can be acquired.

As a result of this routine, the first clutch 5 is controlled so that the rotation speed control for the electric motor/generator 1 in the step S10 forces the rotation speed of the internal combustion engine 6 to decrease via the first clutch 5, and, after the clutch is disengaged, the rotation speed of the internal combustion engine 6 decreases to be equal to or lower than the predetermined resonance frequency band in the predetermined period. Therefore, the time until the stop of the internal combustion engine 6 decreases, and the sense of discomfort caused by the slow decrease in rotation speed of the internal combustion engine 6 felt by the driver and the passengers can be prevented. Moreover, the noise generated by the passage of the engine rotation speed through the resonance frequency band under the state in which the first clutch 5 is engaged can also be prevented.

Along with the decrease in the rotation speed of the internal combustion engine 6 in the step S10, the transmission torque capacity of the first clutch 5 is decreased in the step S11, and hence the required period for the disengagement operation for the first clutch 5 subsequently carried out in the step S13 can be decreased.

Moreover, after the confirmation of the completion of the return operation for the VTC 4 in the step S7, the rotation speed of the internal combustion engine 6 is decreased, and the position of the VTC 4 can always be maintained to the same position when the internal combustion engine is started for the next time. Thus, the valve timing when the internal combustion engine 6 starts can be prevented from varying. Moreover, when the internal combustion engine 6 is started for the next time, the lock pin 26 is always engaged with the engagement hole 30, and the VTC 4 can be prevented from generating a noise when the internal combustion engine 6 starts.

The target motor rotation speed set in the step S5 is maintained during a period from the time t2 to the time t3 in which the return operation for the VTC 4 is carried out. Therefore, the rotation speed of the internal combustion engine 6 during the period is also maintained constant, and the driver does not feel a sense of discomfort caused by a variation in the engine rotation speed.

In the step S6, the controller 12 sets the transmission torque capacity of the first clutch 5 to the intermediate value. As a result, the first clutch 5 disengaged in the MWSC mode resumes the torque transmission, and increases the rotation speed of the electric motor/generator 1 until the internal combustion engine 6 and the electric motor/generator 1 synchronously rotate at the time t2. Thus, even in the MWSC mode, the rotation speed of the internal combustion engine 6 during the stop operation can be quickly decreased by the negative torque of the electric motor/generator 1.

Moreover, before the torque transmission by the first clutch 5, the target rotation speed of the electric motor/generator 1 is set in the step S5 to the target rotation speed of the internal combustion engine 6, and hence when the first clutch 5 starts the torque transmission, the rotation speed of the internal combustion engine 6 can be prevented from varying. Thus, the first clutch 5 can smoothly start the torque transmission without causing the sense of discomfort felt by the driver and the passengers.

The torque transmission capacity of the first clutch 5 is maintained to the intermediate value until the completion of the return operation for the VTC 4 or the time limit. In this state, the electric motor/generator 1 exerts the negative torque to the internal combustion engine 6 via the first clutch 5. For example, if the first clutch 5 is disengaged on this stage, the rotation speed of the internal combustion engine 6 can abruptly increase from an idle rotation speed, but the rotation speed of the internal combustion engine 6 can be restrained from abruptly increasing by maintaining the torque transmission capacity of the first clutch 5 to the intermediate value. Moreover, a required period for the disengagement operation for the first clutch 5 subsequently carried out in the step S13 can be reduced by bringing the state of the first clutch 5 into not the engaged state but the slip state.

As the intermediate value increases, an effect of preventing the abrupt increase in rotation speed increases, but the decrease in required period for the disengagement operation for the first clutch 5 becomes more difficult. Thus, it is desired to set the intermediate value to a value simultaneously realizing both of the effects.

When the ignition button 15 is depressed in the state in which the internal combustion engine 6 drives the electric motor/generator 1 as the generator, it is desired to set the intermediate value depending on the power generation amount. The prevention of the abrupt increase in rotation speed of the internal combustion engine 6 and the decrease in required period for the disengagement operation for the first clutch 5 are simultaneously realized by determining the intermediate value depending on the power generation amount.

The determination whether the elapsed period after the start of the return operation has reached the predetermined period or not in the step S8 has the following meaning. If the oil temperature is low or the VTC 4 fails, the return operation for the VTC 4 takes a time, and the purpose of quickly decreasing the rotation speed of the internal combustion engine 6, thereby decreasing the required time until the operation stops cannot be attained. Thus, the time limit is set, and if the time limit is reached even before the return operation for the VTC 4 is completed, the decrease processing for the rotation speed of the internal combustion engine 6 starting from the step S9 can be carried out. As a result, even if a long period is required for the return operation for the VTC 4, the required period from the turning off of the ignition button 15 to the operation stop of the internal combustion engine 6 can be decreased.

The decrease amount of the transmission torque capacity of the first clutch 5 applied in the step S11 is preferably determined in the following way. Specifically, the negative torque is input from the electric motor/generator 1 via the first clutch 5 to the internal combustion engine 6. Thus, if the rotation speed of the internal combustion engine 6 is decreased, an input amount of the negative toque is also decreased. As a result, even if the transmission torque capacity of the first clutch 5 is decreased, the first clutch 5 does not slip. The first clutch 5 is preferably maintained to a transmission torque capacity which does not present a slip in order to quickly decrease the rotation speed of the internal combustion engine 6.

On the other hand, the transmission torque capacity of the first clutch 5 is preferably small in order to decrease the required period of the disengagement operation for the first clutch 5 carried out in the step S13. The decrease amount in the transmission torque capacity of the first clutch 5 is set to a value simultaneously satisfying both the requirements.

The contents of Tokugan JP 2012-060379, with a filing date of Mar. 16, 2012 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, this invention can reduce the required period from the operation of stopping the rotation of the internal combustion engine to the actual rotation stop thereof, thereby preventing a noise from being generated in the state in which the hybrid electric vehicle is stationary. Thus, this invention provides the effect of eliminating the sense of discomfort felt by the driver and the passengers on the hybrid electric vehicle.

The embodiments of this invention in which an exclusive property or privilege is claimed are defined as follows:

1. A drive control device for a hybrid electric vehicle, the vehicle comprising an internal combustion engine provided with a variable valve timing mechanism, an electric motor, and a clutch connecting the internal combustion engine and the electric motor, the device comprising:
   a sensor configured to detect a request for a stopping operation of the internal combustion engine; and
   a programmable controller programmed to:
      when the request for the stopping operation of the internal combustion engine is detected during an operation of the internal combustion engine, prior to disengaging the clutch, decrease a rotation speed of the internal combustion engine to a predetermined rotation speed higher than a predetermined resonance vibration frequency band by stopping a fuel supply to the internal combustion engine when the clutch is in an engaged state and exerting a negative torque to the internal combustion engine from the electric motor via the clutch in the engaged state;
      disengage the clutch after the rotation speed of the internal combustion engine has decreased to the predetermined rotation speed; and
      control the variable valve timing mechanism to return to a predetermined position prior to the decrease of the rotation speed of the internal combustion engine to the predetermined rotation speed.

2. The drive control device according to claim 1, wherein the controller is further programmed to control a transmission torque capacity of the clutch to an intermediate value smaller than a transmission torque capacity in the engaged state and larger than a transmission torque capacity in a disengaged state, prior to the decrease of the rotation speed of the internal combustion engine to the predetermined rotation speed.

3. The drive control device according to claim 2, wherein the controller is further programmed to maintain the transmission torque capacity of the clutch at the intermediate value during a period of returning the variable valve timing mechanism to the predetermined position.

4. The drive control device according to claim 2, wherein the controller is further programmed to decrease the transmission torque capacity of the clutch in response to a decrease in the rotation speed of the internal combustion engine.

5. The drive control device according to claim 2, wherein the electric motor has a generator function of generating electric power by the operation of the internal combustion engine, and the controller is further programmed to set the intermediate value based on a power generation amount of the electric motor, when the request for the stopping operation of the internal combustion engine is detected during power generation of the electric motor.

6. The drive control device according to claim 2, wherein the controller is further programmed to set a target rotation speed of the electric motor to be equal to a target rotation speed of the internal combustion engine while controlling the transmission torque capacity of the clutch to the intermediate value.

7. The drive control device according to claim 1, wherein the controller is further programmed to decrease the rotation speed of the internal combustion engine to the predetermined rotation speed when the variable valve timing mechanism is not returned to the predetermined position within a predetermined period.

8. The drive control device according to claim 1, wherein the hybrid electric vehicle comprises an electric oil pump for supplying a hydraulic pressure for controlling the clutch, and the controller is further programmed to activate the electric oil pump prior to the decrease of the rotation speed of the internal combustion engine to the predetermined rotation speed.

9. A drive control method for a hybrid electric vehicle comprising an internal combustion engine provided with a variable valve timing mechanism, an electric motor, and a clutch connecting the internal combustion engine and the electric motor, the method comprising:
   when a request for a stopping operation of the internal combustion engine is detected during an operation of the internal combustion engine, prior to disengaging the clutch, decreasing a rotation speed of the internal combustion engine to a predetermined rotation speed higher than a predetermined resonance vibration frequency band by stopping a fuel supply to the internal combustion engine when the clutch is in an engaged state and exerting a negative torque to the internal combustion engine from the electric motor via the clutch in the engaged state;
   disengaging the clutch after the rotation speed of the internal combustion engine has decreased to the predetermined rotation speed; and
   controlling the variable valve timing mechanism to return to a predetermined position prior to the decrease of the rotation speed of the internal combustion engine to the predetermined rotation speed.

10. A drive control device for a hybrid electric vehicle comprising an internal combustion engine provided with a variable valve timing mechanism, an electric motor, and a clutch connecting the internal combustion engine and the electric motor, the device comprising:
   means for decreasing, when a request for a stopping operation of the internal combustion engine is detected during an operation of the internal combustion engine and prior to disengaging the clutch, a rotation speed of the internal combustion engine to a predetermined rotation speed higher than a predetermined resonance vibration frequency band by stopping a fuel supply to the internal combustion engine when the clutch is in an engaged state and exerting a negative torque to the internal combustion engine from the electric motor via the clutch in the engaged state;

means for disengaging the clutch after the rotation speed of the internal combustion engine has decreased to the predetermined rotation speed; and means for controlling the variable valve timing mechanism to return to a predetermined position prior to the decrease of the rotation speed of the internal combustion engine to the predetermined rotation speed.

11. The drive control device according to claim 1, wherein the controller is further programmed to control, while the vehicle is stopped and the internal combustion engine is in operation, the variable valve timing mechanism to return to the predetermined position.

\* \* \* \* \*